(12) United States Patent
Rasberry

(10) Patent No.: US 7,103,926 B1
(45) Date of Patent: Sep. 12, 2006

(54) PORTABLE LATRINE

(76) Inventor: Kenneth E. Rasberry, 2034 Danson St., Jacksonville, FL (US) 32209

( * ) Notice: Subject to any disclaimer, the term of this patent is extended or adjusted under 35 U.S.C. 154(b) by 0 days.

(21) Appl. No.: 11/292,998

(22) Filed: Dec. 5, 2005

(51) Int. Cl.
    *A47K 11/06* (2006.01)
(52) U.S. Cl. ............................................. 4/484; 4/483
(58) Field of Classification Search .................. 4/449, 4/460, 479, 480, 483, 484
    See application file for complete search history.

(56) References Cited

U.S. PATENT DOCUMENTS

| | | | |
|---|---|---|---|
| 3,063,061 A * | 11/1962 | Bertram | 4/484 |
| 3,950,794 A * | 4/1976 | Dalton | 4/484 |
| 4,606,080 A | 8/1986 | Clementino | |
| 5,040,249 A | 8/1991 | Diaz | |
| 5,230,105 A | 7/1993 | Watson | |
| D377,971 S | 2/1997 | Vanakkeren et al. | |
| 6,116,780 A | 9/2000 | Young et al. | |
| 6,647,560 B1 | 11/2003 | Hingley et al. | |

* cited by examiner

*Primary Examiner*—Tuan Nguyen

(57) ABSTRACT

A portable latrine includes an annular seat that has an opening formed therein and a lip formed with a perimeter of the opening that extends downwardly and orthogonally from a seat top surface. A biodegradable sack has an elastic open top end for fitting beneath the seat opening. The elastic outer edge is adaptable between extended and retracted positions and is seated against and on top of the lip for suspending and supporting the bag therefrom. Independently pivotal support legs have opposed ends that are positional adjacent to a seat bottom surface and on a ground surface, respectively. Hinges and clamps are conjoined to the seat bottom at opposed corners thereof. Each clamp is situated adjacent to its corresponding hinge. Straps are connected to selected hinges and include a D-ring conjoined thereto for receiving a backpack portion therethrough such that the latrine can be attached to the backpack.

18 Claims, 4 Drawing Sheets

PORTABLE LATRINE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to latrines and, more particularly, to a portable latrine for outdoor use.

2. Prior Art

Many people find camping in the wilderness an enjoyable form of recreation. Sometimes the camping occurs in conjunction with hunting, fishing, canoe tripping, backpacking, nature study, or scouting. Others spend time in the wilderness in connection with their profession or employment. For some people, however, the necessity to defecate in the wilderness without the convenience of a toilet or outhouse is a deterrent to the wilderness experience.

Unfortunately, nature does not provide a ready substitute for the facility found in most bathrooms. Additionally, because of the rapidly increasing occurrence of Lyme disease in North America, all wilderness campers need to be particularly careful to avoid exposure to deer ticks which are known to transmit the disease. Deer ticks frequently wait in wooded areas or grassy areas for a passing animal onto which they jump and attach themselves. Thus, a human responding to nature's call may acquire a deer tick in the process.

Different types and designs of portable toilets and latrines have previously been provided. Generally, many of these prior designs are characterized in being relatively bulky and cannot be readily assembled and disassembled for easy transport. These prior portable toilets have principally been designed for relatively long-term installation and are not well adapted for use by campers and others who find it desirable to quickly break up camp and move. Many of the prior portable toilets are also not well suited for transport in the confines of a car or relatively small truck or van of the type used by campers. In addition, many of the prior portable toilets and latrines have the drawback of not being sufficiently sanitary after use for transport in a person's car, truck or van.

One prior art example provides a portable toilet comprised of a barrel-shaped stool formed of split cylinders which are detachably mounted at their top ends by an annular seat and at their bottom ends by a pair of C-shaped base-plate elements. The elements of the base-plate are detachably mounted together through pin and shackle connections. A flexible disposable liner is suspended within the stool with the upper end of the liner captured between an outer rim at the upper end of the split cylinders and a downwardly extending rim of the seat. A lid is pivotally mounted on the top of the seat. Unfortunately, this design has an inherent drawback wherein the assembly is not easily transportable between remote locations, unless same is being transported in a vehicle. Thus, the unit becomes limited to fishing and local camping activities, excluding hiking activities and other extended outdoor stays.

Another prior art example shows a portable toilet seat and stand for wilderness camping that includes seat bar members, legs, and crosspieces designed to interlock under the weight of the user. A pair of feet are provided for engagement with the legs to prevent the legs from sinking into soft ground. The portable toilet and stand is lightweight and the disassembled parts may be bundled together in a stuff bag. It is in this feature that the present example has its greatest drawbacks. Having many separate elements to the toilet seat increases the trouble of transport and obviously requires assembling prior to each use, while also increasing the likelihood of misplacing one such an element. This would render the toilet seat useless and inoperable.

Accordingly, a need remains for a portable latrine in order to overcome the above-noted shortcomings. The present invention satisfies such a need by providing a portable latrine that is convenient, comfortable and easy to use, lightweight and portable in design, and sanitary in nature. Such a portable latrine is used at remote locations to provide a sanitary, personal toilet when public facilities are not readily available. At a fully collapsed state the assembly conveniently attaches to a users backpack or hiking-pack for easy transport thereof. Such an portable latrine advantageously eliminates the need for a person to squat over a hole while they are relieving themselves, thereby saving stress and strain on their legs, knees and joints. The biodegradable liners provided therewith effectively shield the user's feet, legs and clothing from waste splash that occurs during the relieving process. The portable latrine is particularly useful among individuals who enjoy outdoor activities such as camping, hiking, fishing and hunting, but can be useful in many other settings as well.

BRIEF SUMMARY OF THE INVENTION

In view of the foregoing background, it is therefore an object of the present invention to provide a portable latrine. These and other objects, features, and advantages of the invention are provided by a foldable and transportable latrine for outdoor use.

The latrine includes an annular seat formed from fluid-impermeable material that has an annular opening centrally formed therein such that a thickness of the annular seat uniformly extends about a perimeter of the opening. Such a seat further has an interior lip monolithically formed with a perimeter of the opening. The interior lip is equidistantly spaced inwardly from an outer edge of the seat and extends vertically downwardly and orthogonally from a top surface of the seat.

A biodegradable sack is included that has an open top end provided with an elastic outer edge suitably sized and shaped for effectively fitting beneath the opening of the seat. Such an elastic outer edge is adaptable between extended and retracted positions and further is seated directly against and on top of the interior lip of the seat in such a manner that the bag becomes vertically suspended and supported from the interior lip.

A plurality of rectilinear support legs have fixed longitudinal lengths and axially opposed end portions positional adjacent to a bottom surface of the seat and directly positional on a ground surface respectively. Such support legs are preferably repeatedly pivotal about a fulcrum axis oriented orthogonal to the axes and disposed at one end portion of the support legs respectively. The other end portion of each support leg preferably includes a base plate that has a planar bottom surface and further has a diamond shape. Such base plates are directly engaged with the ground surface and include oppositely disposed holes formed therein for effectively receiving a plurality of stakes directly therethrough in such a manner that the latrine is advantageously maintained at a substantially stable position during operating conditions.

An inner pair of the support legs terminate beyond a proximal end of the seat when pivoted to a folded position. An outer pair of the support legs terminate beyond a distal end of the seat when pivoted to the folded position. Each support leg is independently pivotal between the folded and unfolded positions. Such support legs preferably lay parallel to a plane of the seat when adapted to the folded position. Each support leg preferably further has a centrally registered longitudinal axis extending parallel to each other when the support legs are articulated to folded positions. Such axes are registered parallel to each other when the support legs are articulated unfolded positions.

A plurality of hinges are directly conjoined to the bottom of the seat. Such hinges are equidistantly spaced apart at opposed corners of the seat. The hinges may be U-shaped and receive one of the end portions of the support legs directly therebetween.

A plurality of clamps are directly conjoined to the bottom of the seat. Such clamps are equidistantly spaced apart at the opposed corners of the seat. Each clamp is situated adjacent to a corresponding one of the hinges respectively. Such clamps preferably include a plurality of resilient arms that are selectively adaptable between extended and compressed positions. The support legs are directly and effectively intercalated between the arms of the clamps respectively when the support legs are pivoted to the folded position.

A plurality of flexible and elongated straps are directly connected to selected ones of the hinges positioned at a proximal end of the bottom surface of the seat. Each strap includes a D-ring directly conjoined thereto that is suitably sized for receiving a selected portion of a backpack therethrough such that the latrine can advantageously and conveniently be directly attached to the backpack and effectively transported between remote locations.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
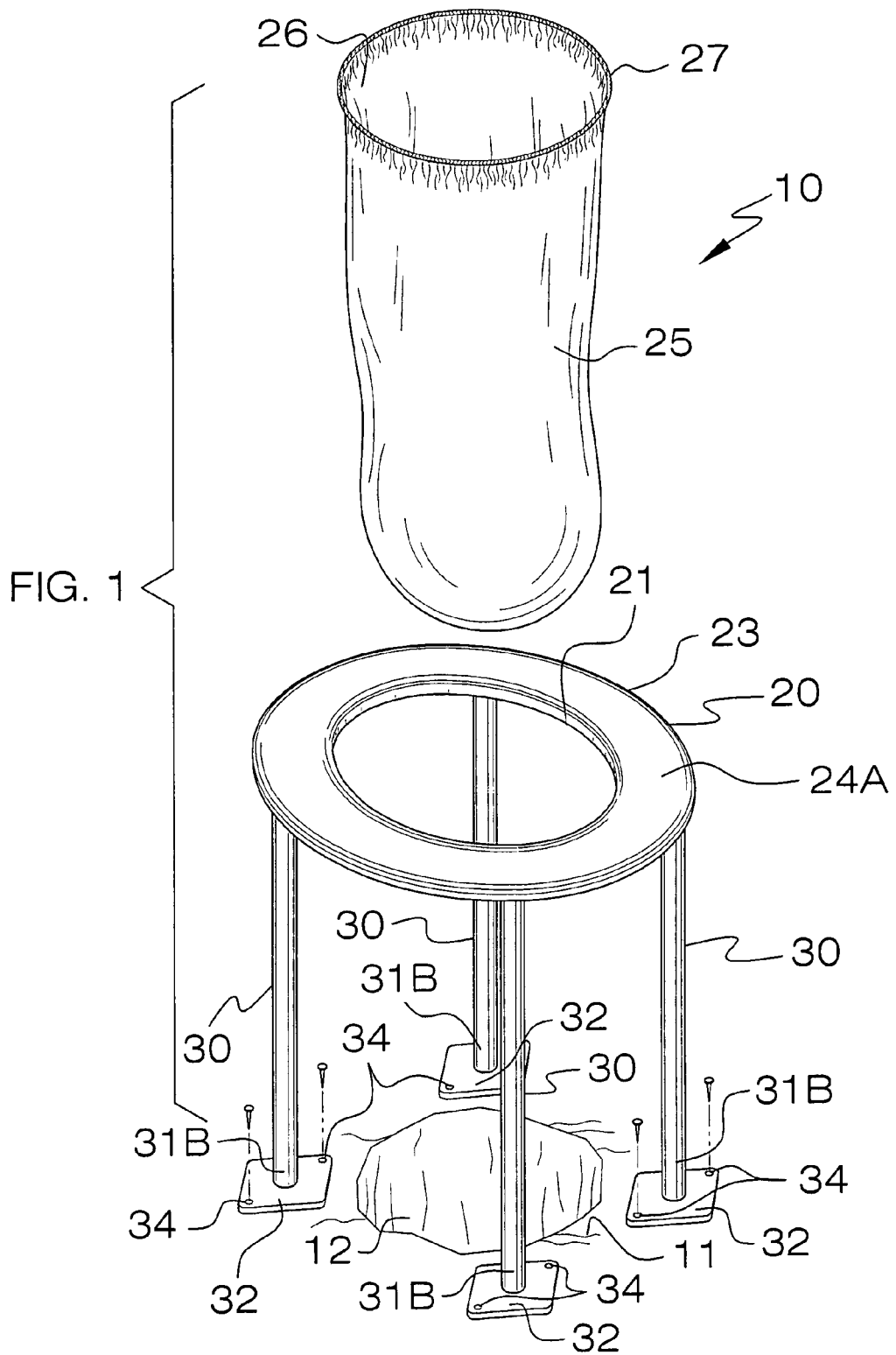
FIG. 1 is a perspective view showing a portable latrine with a biodegradable bag removed therefrom, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1–5 by the reference numeral 10 and is intended to provide a portable latrine. It should be understood that the assembly 10 may be used to provide a portable means for defecating during many different types of outdoor activities and should not be limited in use to only camping activities.

Figure 2:
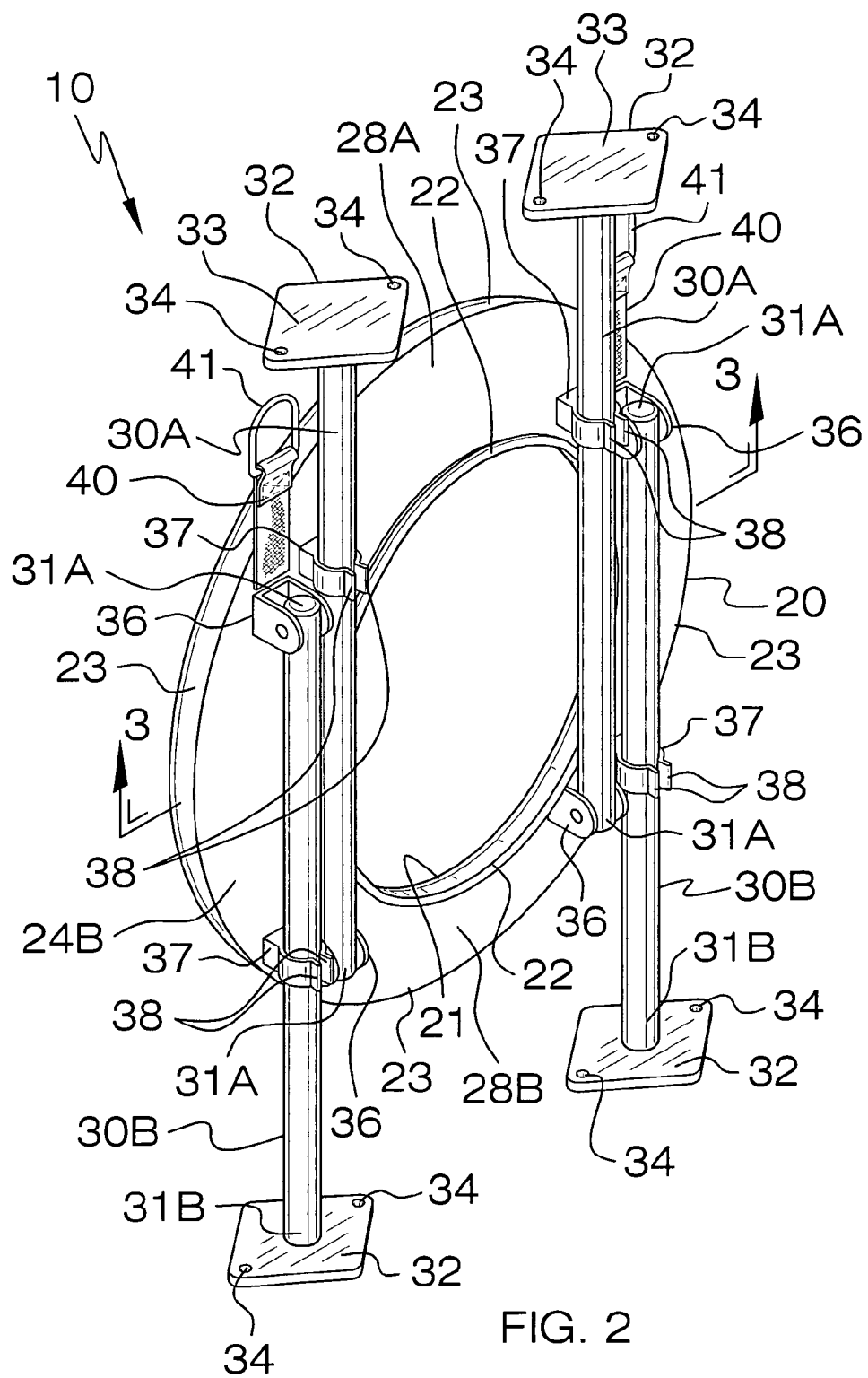
FIG. 2 is a perspective view of the assembly shown in FIG. 1, showing the assembly a folded position for transport or storage.
Figure 3:
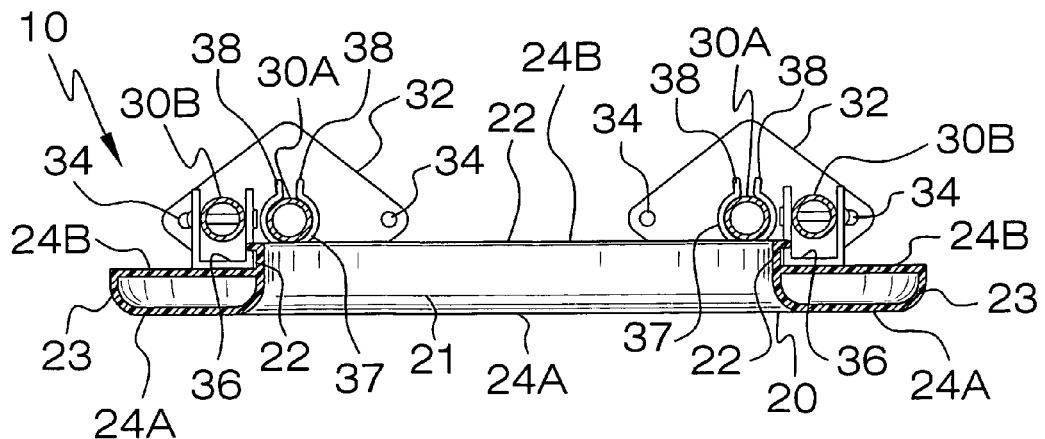
FIG. 3 is a cross-sectional view of the assembly shown in FIG. 2, taken along line 3—3.
Figure 4:
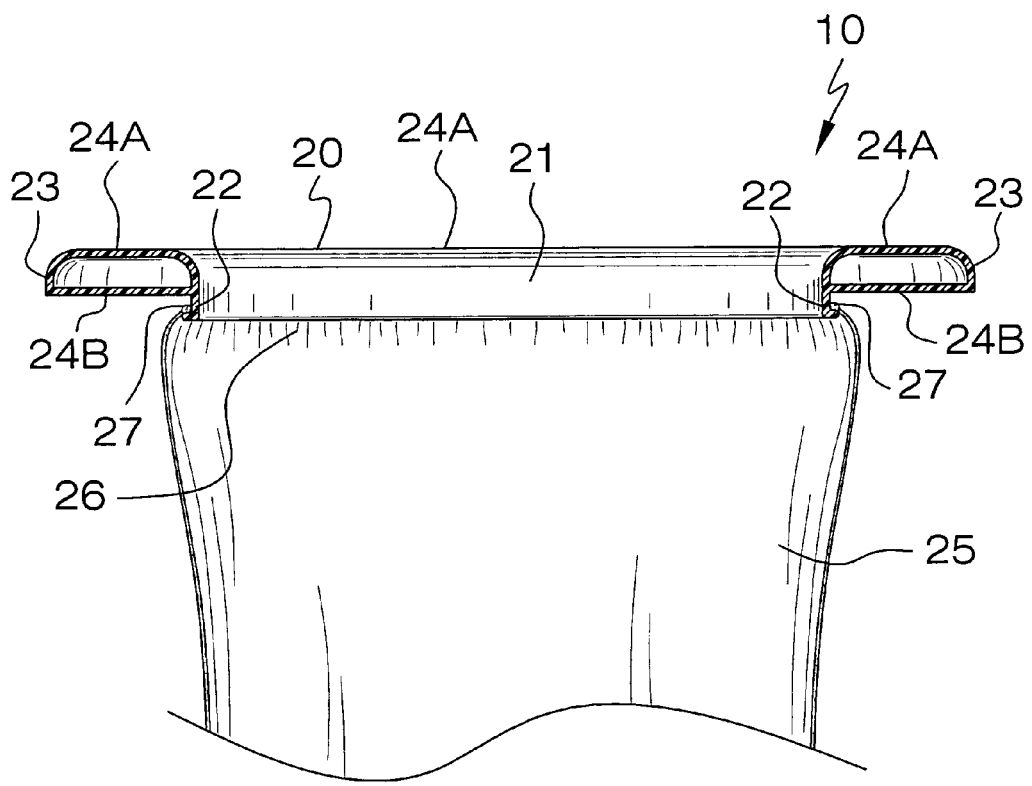
FIG. 4 is a cross-sectional view of the assembly shown in FIG. 5, taken along line 4—4.

Initially referring to FIGS. 1 through 5, the assembly 10 includes an annular seat 20 formed from fluid-impermeable material that has an annular opening 21 centrally formed therein such that a thickness of the annular seat 20 uniformly extends about a perimeter of the opening 21. Such a seat 20 further has an interior lip 22 monolithically formed with a perimeter of the opening 21. The interior lip 22 is equidistantly spaced inwardly from an outer edge 23 of the seat 20 and extends vertically downwardly and orthogonally from a top surface 24A of the seat 20, as is best shown in FIGS. 3 and 4.

Figure 5:
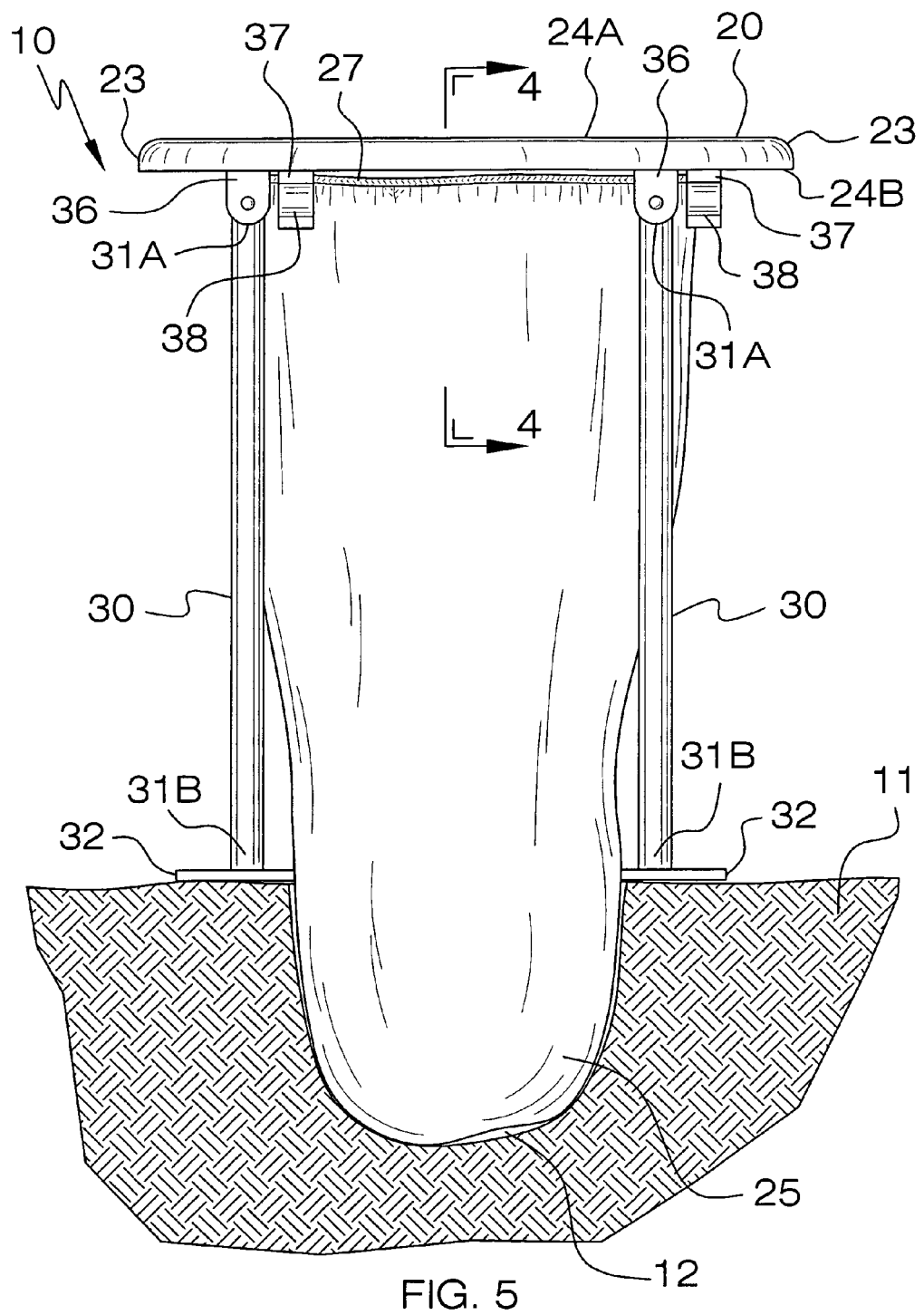
FIG. 5 is a side-elevational view of the assembly shown in FIG. 1, showing the biodegradable bag suspended from the seat for use.

Referring to FIGS. 1, 4 and 5, a biodegradable sack 25 is included that has an open top end 26 provided with an elastic outer edge 27 that is suitably sized and shaped for effectively fitting beneath the opening 21 of the seat 20. Such an elastic outer edge 27 is adaptable between extended and retracted positions and is seated directly against, without the use of intervening elements, and on top of the interior lip 22 of the seat 20 in such a manner that the bag 25 effectively becomes vertically suspended and supported from the interior lip 22.

Referring to FIGS. 1, 2, 3 and 5, a plurality of rectilinear support legs 30 have fixed longitudinal lengths and axially opposed end portions 31 positional adjacent to a bottom surface 24B of the seat 20 and directly positional, without the use of intervening elements, on a ground surface 11 respectively. Such support legs 30 are repeatedly pivotal about a fulcrum axis oriented orthogonal to the axes and disposed at one end portion 31A of the support legs 30 respectively, which is essential for allowing the assembly 10 to be repeatedly adapted between extended and folded positions. The other end portion 31B of each support leg 30 includes a base plate 32 that has a planar bottom surface 33 and further has a diamond shape. Such base plates 32 are directly engaged, without the use of intervening elements, with the ground surface 11 and include oppositely disposed holes 34 formed therein for effectively receiving a plurality of stakes (not shown) directly therethrough, without the use of intervening elements, which is essential such that the latrine 10 is advantageously maintained at a substantially stable position during operating conditions. The support legs 30 effectively suspend the seat 20 above the ground surface 11, which is a crucial and advantageous feature for reducing the user's chances of coming in contact with a disease carrying insect or microorganism.

Referring to FIGS. 2 and 3, an inner pair 30A of the support legs 30 terminate beyond a proximal end 28A of the seat 20 when pivoted to a folded position. An outer pair 30B of the support legs 30 terminate beyond a distal end 28B of the seat 20 when pivoted to the folded position, which is critical and necessary so that the latrine 10 can be conveniently and comfortably attached to a conventional backpack. Each support leg 30 is independently pivotal between the folded and unfolded positions. Such support legs 30 lay parallel to a plane of the seat 20 when adapted to the folded position, as is best shown in FIG. 3, which is a crucial and advantageous feature for allowing the assembly 10 to assume the most compact shape possible for easy transport and storage thereof. Each support leg 30 further has a centrally registered longitudinal axis extending parallel to each other when the support legs 30 are articulated to folded positions. Such axes are registered parallel to each other when the support legs 30 are articulated unfolded positions.

Referring to FIGS. 2, 3 and 5, a plurality of hinges 36 are directly conjoined, without the use of intervening elements, to the bottom 24B of the seat 20. Such hinges 36 are equidistantly spaced apart at opposed corners of the seat 20. The hinges 36 are U-shaped and receive one of the end portions 31A of the support legs 30 directly therebetween, without the use of intervening elements.

Again Referring to FIGS. 2, 3 and 5, a plurality of clamps 37 are directly conjoined, without the use of intervening elements, to the bottom 24B of the seat 20. Such clamps 37 are equidistantly spaced apart at the opposed corners of the seat 20. Each clamp 37 is situated adjacent to a corresponding one of the hinges 36 respectively. Such clamps 37 include a plurality of resilient arms 38 that are selectively adaptable between extended and compressed positions, which is a vital feature for allowing the clamps 37 to grasp and maintain a hold of the support legs 30 until the user biases the support legs 30 to an extended position. The support legs 30 are directly and effectively intercalated, without the use of intervening elements, between the arms 38 of the clamps 37 respectively when the support legs 30 are pivoted to the folded position. This feature advantageously prevents the support legs 30 from randomly pivoting about during transport, which can become frustrating and hinder some while traveling in the confined spaces often encountered on hiking trails and other outdoors settings.

Referring to FIG. 2, a plurality of flexible and elongated straps 40 are directly connected, without the use of intervening elements, to selected ones 36A of the hinges 36 positioned at a proximal end 28A of the bottom surface 24B of the seat 20. Each strap 40 includes a D-ring 41 directly conjoined, without the use of intervening elements, thereto that is suitably sized for receiving a selected portion of a backpack therethrough, which is important such that the latrine 10 can advantageously and conveniently be directly attached to the backpack and effectively transported between remote locations. Of course, the straps 40 may have push-clip fasteners, which are frequently employed with hiking- and backpacks, conjoined thereto, as is obvious to a person of ordinary skill in the art.

In use, an outdoors enthusiast, such as a camper, hiker or hunter to name a few, first digs a hole 12 in the ground surface 11. The user then unfolds the support legs 30 and places the assembly 10 on the ground surface 11 with the opening 21 directly positioned over the hole 12. The stakes are then inserted through the holes 34 for anchoring the assembly 10 and a biodegradable sack 25 is attached to and suspended from the interior lip 22. Once the bag 25 is attached the person can comfortably sit on the latrine 10 at will, same as with a conventional toilet. After the defecating and urinating process is complete the user can either detach the bag 25 and bury same in the hole 12 or allow another person to use the assembly 10 with the same bag 25. In the latter case it is suggested to bury the bag 25 at the end of each day for sanitation reasons.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A foldable and transportable latrine for outdoor use, said latrine comprising:

an annular seat formed from fluid-impermeable material and having an annular opening centrally formed therein such that a thickness of said annular seat uniformly extends about a perimeter of said opening, said seat further having an interior lip monolithically formed with a perimeter of the opening, said interior lip being equidistantly spaced inwardly from an outer edge of said seat and extending vertically downwardly and orthogonally from a top surface of said seat;

a biodegradable sack having an open top end provided with an elastic outer edge suitably sized and shaped for fitting beneath said opening of said seat, said elastic outer edge being adaptable between extended and retracted positions and further being seated directly against and on top of said interior lip of said seat in such a manner that said bag becomes vertically suspended and supported from said interior lip;

a plurality of rectilinear support legs having fixed longitudinal lengths and axially opposed end portions positional adjacent to a bottom surface of said seat and directly positional on a ground surface respectively;

a plurality of hinges directly conjoined to said bottom of said seat, said hinges being equidistantly spaced apart at opposed corners of said seat;

a plurality of clamps directly conjoined to said bottom of said seat, said clamps being equidistantly spaced apart at said opposed corners of said seat, each said clamps being situated adjacent to a corresponding ones of said hinges respectively; and a plurality of flexible and elongated straps directly connected to selected ones of said hinges positioned at a proximal end of said bottom surface of said seat, each said straps including a D-ring directly conjoined thereto and suitably sized for receiving a selected portion of a backpack therethrough such that said latrine can be directly attached to the backpack and transported between remote locations.

2. The assembly of claim 1, wherein each said support legs has a centrally registered longitudinal axis extending parallel to each other when said support legs are articulated to a folded positions, said axes being registered parallel to each other when said support legs are articulated to an unfolded position.

3. The assembly of claim 1, wherein said hinges are U-shaped and receive one said end portions of said support legs directly therebetween, said support legs being repeatedly pivotal about a fulcrum axis oriented orthogonal to the axes and disposed at said one end portions of said support legs respectively.

4. The assembly of claim 3, wherein another said end portions of said support legs comprise: a plurality of base plates having planar bottom surfaces and further having diamond shapes, said base plates being directly engaged with the ground surface and including oppositely disposed holes formed therein for receiving a plurality of stakes directly therethrough in such a manner that said latrine is maintained at a substantially stable position during operating conditions.

5. The assembly of claim 1, wherein said clamps comprise: a plurality of resilient arms selectively adaptable between extended and compressed positions, said support legs being directly intercalated between said arms of said clamps respectively when said support legs are pivoted to the folded position.

6. The assembly of claim 1, wherein said support legs lay parallel to a plane of said seat when adapted to the folded position.

7. A foldable and transportable latrine for outdoor use, said latrine comprising:
   an annular seat formed from fluid-impermeable material and having an annular opening centrally formed therein such that a thickness of said annular seat uniformly extends about a perimeter of said opening, said seat further having an interior lip monolithically formed with a perimeter of the opening, said interior lip being equidistantly spaced inwardly from an outer edge of said seat and extending vertically downwardly and orthogonally from a top surface of said seat;
   a biodegradable sack having an open top end provided with an elastic outer edge suitably sized and shaped for fitting beneath said opening of said seat, said elastic outer edge being adaptable between extended and retracted positions and further being seated directly against and on top of said interior lip of said seat in such a manner that said bag becomes vertically suspended and supported from said interior lip;
   a plurality of rectilinear support legs having fixed longitudinal lengths and axially opposed end portions positional adjacent to a bottom surface of said seat and directly positional on a ground surface respectively, wherein an inner pair of said support legs terminate beyond a proximal end of said seat when pivoted to a folded position, an outer pair of said support legs terminate beyond a distal end of said seat when pivoted to the folded position;
   a plurality of hinges directly conjoined to said bottom of said seat, said hinges being equidistantly spaced apart at opposed corners of said seat;
   a plurality of clamps directly conjoined to said bottom of said seat, said clamps being equidistantly spaced apart at said opposed corners of said seat, each said clamps being situated adjacent to a corresponding ones of said hinges respectively; and
   a plurality of flexible and elongated straps directly connected to selected ones of said hinges positioned at a proximal end of said bottom surface of said seat, each said straps including a D-ring directly conjoined thereto and suitably sized for receiving a selected portion of a backpack therethrough such that said latrine can be directly attached to the backpack and transported between remote locations.

8. The assembly of claim 7, wherein each said support legs has a centrally registered longitudinal axis extending parallel to each other when said support legs are articulated to a folded positions, said axes being registered parallel to each other when said support legs are articulated to an unfolded position.

9. The assembly of claim 7, wherein said hinges are U-shaped and receive one said end portions of said support legs directly therebetween, said support legs being repeatedly pivotal about a fulcrum axis oriented orthogonal to the axes and disposed at said one end portions of said support legs respectively.

10. The assembly of claim 9, wherein another said end portions of said support legs comprise: a plurality of base plates having planar bottom surfaces and further having diamond shapes, said base plates being directly engaged with the ground surface and including oppositely disposed holes formed therein for receiving a plurality of stakes directly therethrough in such a manner that said latrine is maintained at a substantially stable position during operating conditions.

11. The assembly of claim 7, wherein said clamps comprise: a plurality of resilient arms selectively adaptable between extended and compressed positions, said support legs being directly intercalated between said arms of said clamps respectively when said support legs are pivoted to the folded position.

12. The assembly of claim 7, wherein said support legs lay parallel to a plane of said seat when adapted to the folded position.

13. A foldable and transportable latrine for outdoor use, said latrine comprising:
   an annular seat formed from fluid-impermeable material and having an annular opening centrally formed therein such that a thickness of said annular seat uniformly extends about a perimeter of said opening, said seat further having an interior lip monolithically formed with a perimeter of the opening, said interior lip being equidistantly spaced inwardly from an outer edge of said seat and extending vertically downwardly and orthogonally from a top surface of said seat;
   a biodegradable sack having an open top end provided with an elastic outer edge suitably sized and shaped for fitting beneath said opening of said seat, said elastic outer edge being adaptable between extended and retracted positions and further being seated directly against and on top of said interior lip of said seat in such a manner that said bag becomes vertically suspended and supported from said interior lip;
   a plurality of rectilinear support legs having fixed longitudinal lengths and axially opposed end portions positional adjacent to a bottom surface of said seat and directly positional on a ground surface respectively, wherein an inner pair of said support legs terminate beyond a proximal end of said seat when pivoted to a folded position, an outer pair of said support legs terminate beyond a distal end of said seat when pivoted to the folded position, wherein each said support leg is independently pivotal between the folded and unfolded positions;

a plurality of hinges directly conjoined to said bottom of said seat, said hinges being equidistantly spaced apart at opposed corners of said seat;

a plurality of clamps directly conjoined to said bottom of said seat, said clamps being equidistantly spaced apart at said opposed corners of said seat, each said clamps being situated adjacent to a corresponding ones of said hinges respectively; and a plurality of flexible and elongated straps directly connected to selected ones of said hinges positioned at a proximal end of said bottom surface of said seat, each said straps including a D-ring directly conjoined thereto and suitably sized for receiving a selected portion of a backpack therethrough such that said latrine can be directly attached to the backpack and transported between remote locations.

14. The assembly of claim 13, wherein each said support legs has a centrally registered longitudinal axis extending parallel to each other when said support legs are articulated to a folded positions, said axes being registered parallel to each other when said support legs are articulated to an unfolded position.

15. The assembly of claim 13, wherein said hinges are U-shaped and receive one said end portions of said support legs directly therebetween, said support legs being repeatedly pivotal about a fulcrum axis oriented orthogonal to the axes and disposed at said one end portions of said support legs respectively.

16. The assembly of claim 15, wherein another said end portions of said support legs comprise: a plurality of base plates having planar bottom surfaces and further having diamond shapes, said base plates being directly engaged with the ground surface and including oppositely disposed holes formed therein for receiving a plurality of stakes directly therethrough in such a manner that said latrine is maintained at a substantially stable position during operating conditions.

17. The assembly of claim 13, wherein said clamps comprise: a plurality of resilient arms selectively adaptable between extended and compressed positions, said support legs being directly intercalated between said arms of said clamps respectively when said support legs are pivoted to the folded position.

18. The assembly of claim 13, wherein said support legs lay parallel to a plane of said seat when adapted to the folded position.

* * * * *